Dec. 2, 1958 W. W. MORRIS 2,863,032
FLEXIBLE GLASS INSULATED HEATER WIRE
Filed July 19, 1954

*INVENTOR.*
WILLIAM WARDER MORRIS
BY *William Warder Morris*

United States Patent Office 2,863,032
Patented Dec. 2, 1958

2,863,032

FLEXIBLE GLASS INSULATED HEATER WIRE

William Warder Morris, Haddam, Conn., assignor of one-half to Carlos B. Ellis, Middletown, and one-half to Jean K. Morris, Haddam, Conn.

Application July 19, 1954, Serial No. 444,295

1 Claim. (Cl. 201—63)

This invention relates to heater wires. Those skilled in the art of wire insulation and protection know that the effects of temperature on organic substances are deleterious. Even such low carbon materials as silicone resins and rubbers are unsatisfactory for continuous operation above 600° F. Tetrafluoroethylene compounds vapor off between 650° and 700° F. and, at 750° F. and above, insulation is very difficult to maintain "in situ," so that the art has been constrained to maintain magnesium oxides and similar refractory materials in position against hot wires by heavy metallic sheaths in the forms of rods and plates with wires embedded in refractory materials in the relatively heavy metallic closures. This has resulted in many instances in an undesirable increase in mass with consequent lag in heat dissipation. Again the previous means of insulating lead wires to operate in ambient temperatures above 500° F. has proven troublesome and costly.

My concepts herein described overcome many limitations of the prior art and extend the uses of wire for a multitude of heaters or resistor assemblies, and enable many problems in design of electrical equipment to be easily resolved.

It has been generally true that a wide variety of insulating materials and metallic braids have been applied to wire but all the previous methods are confining.

For example, lead sheathed cable in various sizes generally consists of wire, asbestos covered, and with a thickness of lead extruded on the external surface, of sufficient mass to be mechanically sound in use; said mass increases the radius of bend recommended, is costly, and of course, does not permit operation above the melting point of lead. Glass fibres are extensively used and perform well, but, since these structures have low abrasion resistance, it is necessary to insulate them with potting varnishes, mechanically protect them with multiple wire braids, and by various wrap and extrusions, viz: tetrafluoroethylenes, vinyls, etc.

A serious defect in the application of wire braids in these instances is the fact that on continued flexing the internal surface of the braid presents to the insulating glass a multiplicity of tangential surfaces which can abraid the undercoating to reduce electric strength. Also said braids or armoring wraps contain more mass than is often desirable and for many critical applications, viz: weaving into resistance nets, results in rejects and very materially reduces the range of sizes of wires suitable for net-making. Round wire braids tend to open when contracted, unless constructed of a relatively large number of fine strands, closely spaced.

One object of the invention is to provide a flexible insulated heater wire that may be of small diameter and which includes an improved sheath for holding the insulation in situ while dissipating thermal energy at a fast rate. Other objects will appear from the following detailed description of several forms of the invention.

I have discovered and reduced to practice heater wires incorporating flat metallic lamé in a braid or lamé forming a cover over an insulating material, thereby overcoming many of the problems in making metallic sheathed wire which is electrically insulated, particularly in small sizes. Inherent in the lamé overbraid is the essential idea of flatness, low mass and reduced number of interstices which results in structures of various properties depending on the combinations selected to meet varying design problems. Also in handling said wires as in a loom in complex configurations of circuit windings the lamé does not open up in either direction and presents a more receptive surface for the distribution of solders and sprayed metallic fillers.

Figure 1:
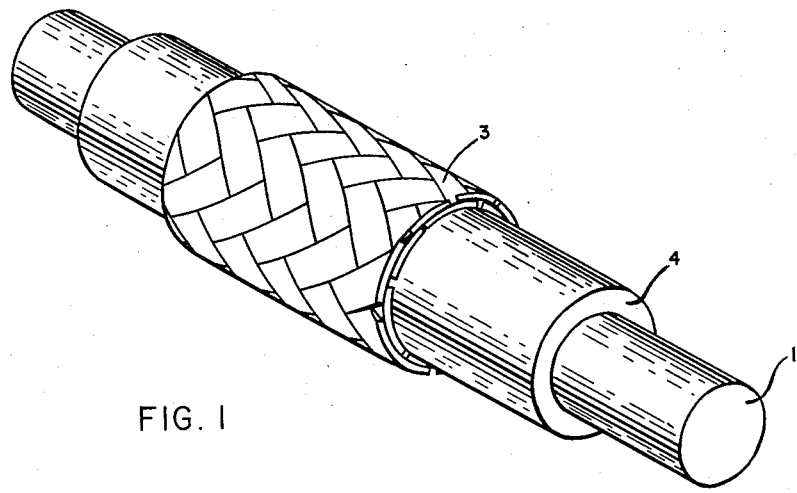
Fig. 1 is a perspective view of a heater wire embodying the invention.

In the form shown in Fig. 1, the current-bearing core of the heater wire is indicated at 1, the insulation over the core 1 at 4 and the outer lamé sheath at 3. The layer of insulation 4 may be formed by an extrusion of silicone rubber over the conductor 1 and while this material has many advantages it is of low durometer and the scratch resistance is low. Heretofore insulation of silicone rubber has been covered with braids of glass fibers and/or wrappings which improve but do not eliminate this difficulty. The lamé covering 3 allows this type of heater wire great freedom of use and extends the uses of silicone rubber in heater wire insulation by effecting improved heat dissipation and by tending to eliminate the abrasion problems. If desired the rubber covering may be formed by positioning partially cured neoprene or silicone rubber around the core 1 and after applying the outer covering 3, heating the wire to cure the rubber. The components of the resultant structure are sealed together in this manner with remarkable success. The thermal range of the insulating materials is extended, the conductivity is good and the structure is imperforate and thus is suitable for use in many solutions and certain corrosive vapors. The resultant structure will also strongly resist short circuits. The use of a supporting glass fabric as a carrier for the partially cured films of neoprene or silicone rubber is recommended and under some conditions is necessary as it obviates many difficulties in the handling of the rubber material through the process of slitting, spooling and braiding. It also adds to the finished structure. This method may be used successfully with aluminum, brass, nickel or other alloy lamé forming a sheath over the insulating rubber material.

Figure 2:
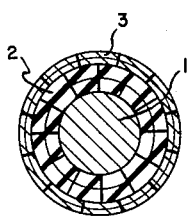
Fig. 2 is a cross sectional view of a heater wire of somewhat modified form, on a smaller scale.

As in the form of Fig. 2, the insulation material, when in film form, may be slit to the dimension of lamé, generally $\frac{1}{64}$ or $\frac{1}{50}$ of an inch in width, and braided over the wire 1, as at 2. The braided insulation is then covered with metallic lamé. The polyester resins are often particularly suitable for the insulation material.

Figure 4:
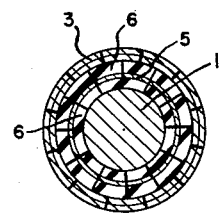
Fig. 4 is a view similar to Fig. 2 but illustrating a further modification.

As in the form of Fig. 4, the insulation material, when in film form, may be laminated to metallic foil and the lamination then slit to the dimensions of lamé. The resulting material is then braided over the wire 1 to form an insulating cover having a metallic inclusion which aids in the dissipation of thermal energy. In the form of Fig. 4, the metallic inclusion or foil is indicated at 5 and the insulating film at 6. An outer covering of the metallic lamé is provided over the braided laminated material and the resultant product very effectively dissipates thermal energy, tending to prevent the melting of the polyester or like material used for insulating purposes.

Figure 5:
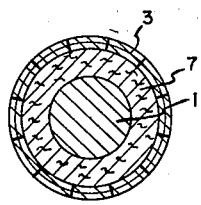
Fig. 5 is a view similar to Fig. 4 and illustrating still another form of the heater wire.

The form shown in Fig. 5 may run at higher temperatures. In this form the wire 1 is covered with glass fibers woven or served on the wire to provide an insulating wall having a thickness of approximately .015 of an inch. The metallic lamé is then braided over the glass fiber wall as on a No. 2 butt braider using Mossberg tension-controlled carriers. The lamé used to form the outer cover 3 may be of nickel and may have a thickness of approximately .0015 to .002 of an inch. The braided metallic cover may be formed by approximately 12 to 16 strands or strips of the metallic lamé. The resulting wire may then be incorporated in a heating structure carrying sufficient current to actually fuse the glass fibers. When the heater wire cools the glass may craze or even fracture. However, the very tightly braided cover 3 formed of lamé holds the glass in situ so that when the heater wire is reheated the mass of glass material fuses again to operate safely as an insulating material even at high temperatures. By using carbonized nickel a high degree of emissivity may be obtained. Since glass has a thermal conductivity which is only a small fraction of that of metals, the use of the lamé in intimate contact with the glass is particularly effective as a dissipator of thermal energy. It has been found that heater wire constructed in this manner and dissipating 50 watts per square inch may be safely operated in air. It will also be understood that in the form of Fig. 5, the metallic outer covering or lamé protects the glass from abrasion.

Figure 6:
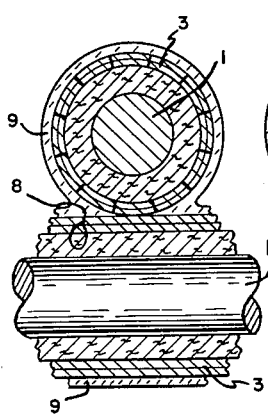
Fig. 6 is a fragmentary cross sectional view illustrating a resistor net including a heater wire of still another form.

In the form shown in Fig. 6, the heater wire is similar to that shown in Fig. 5. However, in the form of Fig. 6, wherein the heater wire is shown in a resistor net, the entire net may be dipped in enamel, for example, to form an outer covering 9 over the metallic lamé 3. In such a resistor structure the lamé 3 may be formed of aluminum and the insulation material 8 disposed between the wire 1 and the cover 3 may be of glass fibers, as in the form of Fig. 5. One of the advantages of the aluminum lamé, besides its low cost, is that a non-spalling aluminum enamel may be dipped or sprayed over a structure incorporating the heater wire and then fired in a regular enameling furnace. Such a structure has excellent electric strength and is strongly resistant to attack by many chemical substances. Furthermore, the structure has excellent emissivity for radiation purposes and dissipates heat very efficiently for resistor purposes.

Figure 3:
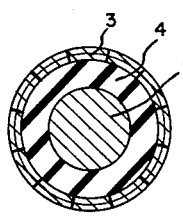
Fig. 3 is a cross sectional view of the heater wire shown in Fig. 1.
Figure 7:
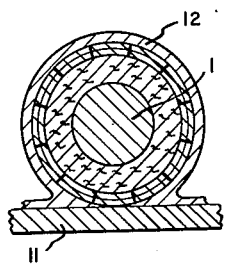
Fig. 7 is a cross sectional view illustrating a further modification of the heater wire.

The form shown in Fig. 7 is similar to that shown in Fig. 3 and described above. However, in the form shown in Fig. 7, the metallic lamé may be formed of brass, for example, and is provided with an outer cover 10 formed of zinc. This outer cover over the metallic lamé may be formed by immersing the metallic lamé in zinc chloride and then immersing the same in a zinc bath.

Figure 8:
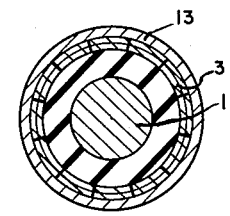
Fig. 8 is a fragmentary cross sectional view of a resistor assembly including another form of the heater wire.

The heater wire of the form shown in Fig. 8 is similar to that shown in the form of Fig. 6, but in the form of Fig. 8, wherein the wire is incorporated in a resistor structure, the wire is suitably secured to a metal heat-dissipating plate 11 and the wire and the plate, instead of having an outer covering of enamel or the like formed by dipping or spraying the entire structure, is sprayed or dipped in a molten solder, such as silver, zinc or aluminum. This spraying or dipping provides an imperforate cover without danger of impairing the electric strength of the heater wire. If desired, the glass insulating material disposed between the wire 1 and the metallic lamé may be fused before immersion or spraying of the structure. Thermal conductivity throughout a structure of this type is very rapid.

Figure 9:
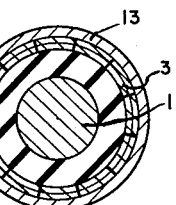
Fig. 9 is a view similar to Fig. 2 illustrating still another modification of the heater wire.

The form of Fig. 9 is very similar to the form of Fig. 7. However, in the form of Fig. 9 the outer covering over the cover of metallic lamé 3 is formed of silver solder and indicated at 13. The silver solder cover may be applied at the time the heater wire is incorporated in a resistor or heater structure.

From the foregoing it will be manifest that in accordance with the disclosure there is provided a heater wire which, in each instance, has a tightly braided or lamé cover insulated from the current-conducting wire and which, while facilitating the holding of the insulation material in situ, even at very high temperatures, tends to increase the dissipation of thermal energy from the heater wire.

Having thus described my invention, I claim:

In a resistor wire, an electrically conducting heater wire strand, a dielectric cover over the wire strand including a mass of glass fibers, and a physically strengthening and heat-dissipating cover of thermally conducting metallic filaments directly over the glass fibers, said filaments being of flattened cross section to provide maximum contact with the glass fibers for dissipation of heat therefrom by conduction, and the metallic filaments being tightly braided to inhibit dislocation of the glass fibers at temperatures above the fusion point of the fibers.

References Cited in the file of this patent

UNITED STATES PATENTS

| | | |
|---|---|---|
| 2,111,639 | Peterson | Mar. 22, 1938 |
| 2,162,953 | Lattin | June 20, 1939 |
| 2,460,795 | Warrick | Feb. 1, 1949 |
| 2,692,218 | Nicoll | Oct. 19, 1954 |